(12) United States Patent
Chung

(10) Patent No.: US 6,542,149 B1
(45) Date of Patent: Apr. 1, 2003

(54) METHOD FOR TRANSMITTING MULTIMEDIA WIRELESS DATA TO A HOST SYSTEM

(75) Inventor: Sun A Chung, Seoul (KR)

(73) Assignee: Sejin Electron Inc., Seoul (KR)

( * ) Notice: Subject to any disclaimer, the term of this patent is extended or adjusted under 35 U.S.C. 154(b) by 0 days.

(21) Appl. No.: 09/465,020

(22) Filed: Dec. 16, 1999

(30) Foreign Application Priority Data

Sep. 22, 1999 (KR) ............................................. 99-41033
Sep. 22, 1999 (KR) ............................................. 99-41034

(51) Int. Cl.[7] ................................................ G09G 5/08
(52) U.S. Cl. ...................................... 345/158; 345/169
(58) Field of Search ................................. 345/158, 169; 348/734; 340/825.56, 825.57, 825.69, 825.72, 825.44, 7.2

(56) References Cited

U.S. PATENT DOCUMENTS 5,410,326 A * 4/1995 Goldstein
5,949,351 A * 9/1999 Hahm ........................ 348/734
6,107,992 A * 8/2000 Ishigaki ...................... 345/158

* cited by examiner

Primary Examiner—Regina Liang

(57) ABSTRACT

The present invention provides a method for transmitting multimedia wireless data to a host system, which comprises the steps of generating a key signal corresponding to a selected key; converting the key signal into a series of data symbols, each of the data symbols having a plurality of chip data, and activating one or more chip data from the plurality of chip data; and converting each data symbol having the one or more activated chip data into an infrared pulse stream and transmitting it as the multimedia wireless data. Further, as a result of activating only a portion of of the plurality of chip data, the power consumption of the system is lowered.

4 Claims, 9 Drawing Sheets

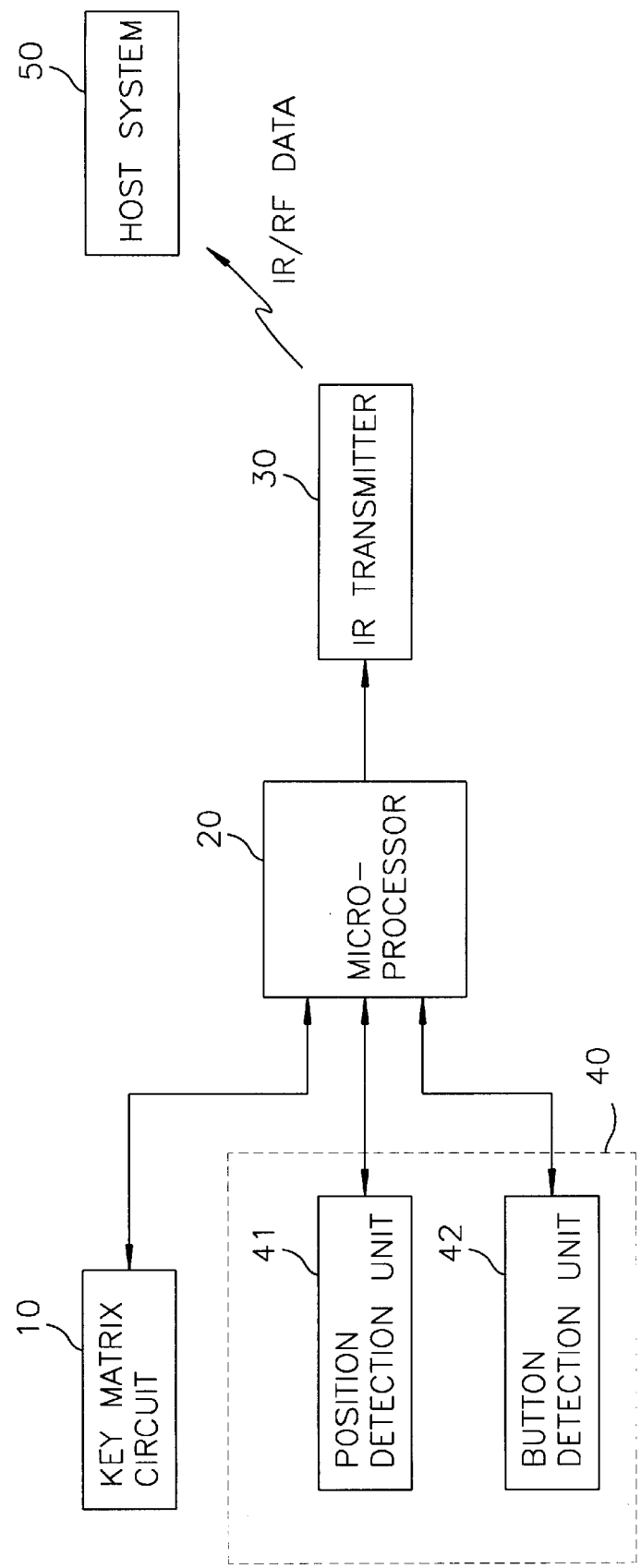

FIG.2A
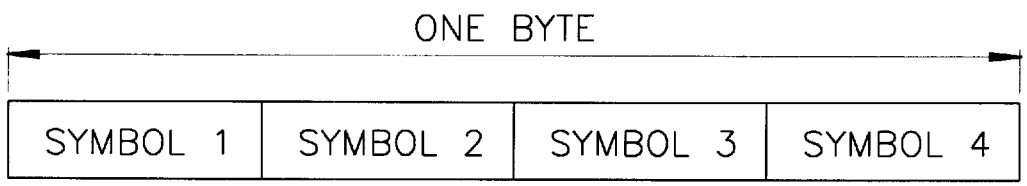
FIG.2B
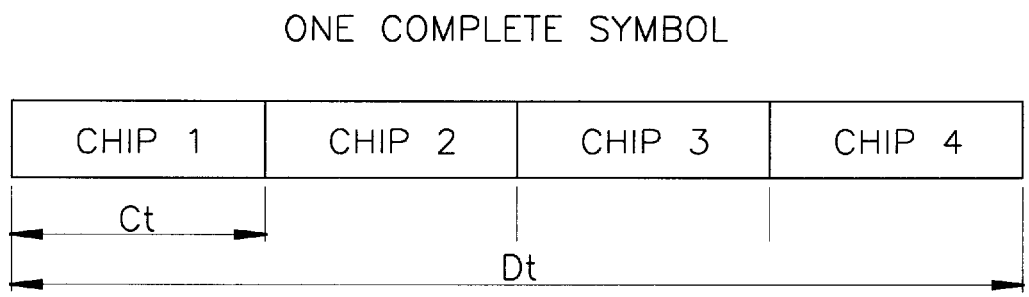
FIG.2C
| DATA BIT PAIR(DBP) | 4PPM DATA SYMBOL(DD) |
|---|---|
| 00 | 1000 |
| 01 | 0100 |
| 10 | 0010 |
| 11 | 0001 |

IR TRANSMISSION FORMAT

FIG.5

PACKET DATA FORMAT FOR DESKTOP KEYBOARD

| | BIT 7 | BIT 6 | BIT 5 | BIT 4 | BIT 3 | BIT 2 | BIT 1 | BIT 0 |
|---|---|---|---|---|---|---|---|---|
| BYTE 1 | 0 | 0 | 0 | 0 | 0 | APPLICATION | L-WINDOWS | R-WINDOWS |
| BYTE 2 | MR/B | FN | L-Shift | R-Shift | L-Alt | R-Alt | L-Ctrl | R-Ctrl |
| BYTE 3 | K7 | K6 | K5 | K4 | K3 | K2 | K1 | K0 |
| BYTE 4 | 0 | 0 | 0 | 0 | 0 | 0 | 0 | 0 |
| BYTE 5 | 0 | 0 | 0 | 0 | 0 | 0 | 0 | 0 |
| BYTE 6 | USER ID | | | | CHECKSUM | | | |

FIG.6

PACKET DATA FORMAT FOR MOUSE(TRACK-BALL)

| | BIT 7 | BIT 6 | BIT 5 | BIT 4 | BIT 3 | BIT 2 | BIT 1 | BIT 0 |
|---|---|---|---|---|---|---|---|---|
| BYTE 1 | 1 | 1 | 1 | 1 | 1 | M | R | L |
| BYTE 2 | X-SIGN | X-MOVEMENT DATA | | | | | | |
| BYTE 3 | Y-SIGN | Y-MOVEMENT DATA | | | | | | |
| BYTE 4 | 0 | 0 | 0 | 0 | 0 | 0 | 0 | 0 |
| BYTE 5 | 0 | 0 | 0 | 0 | 0 | 0 | 0 | 0 |
| BYTE 6 | USER ID | | | | CHECKSUM | | | |

FIG. 7

PACKET DATA FORMAT FOR TABLET(DIGITIZER)

| | BIT 7 | BIT 6 | BIT 5 | BIT 4 | BIT 3 | BIT 2 | BIT 1 | BIT 0 |
|---|---|---|---|---|---|---|---|---|
| BYTE 1 | 1 | 1 | 0 | 1 | 1 | PROXIMITY | POINTER | BUTTON |
| BYTE 2 | X15 | X14 | X13 | X12 | X11 | X10 | X9 | X8 |
| BYTE 3 | X7 | X6 | X5 | X4 | X3 | X3 | X2 | X1 |
| BYTE 4 | Y7 | Y6 | Y5 | Y4 | Y3 | Y2 | Y1 | Y0 |
| BYTE 5 | SP | P6 | P5 | P4 | P3 | P2 | P1 | P0 |
| BYTE 6 | Y11 | Y10 | Y9 | Y8 | | CHECKSUM | | |

*FIG. 8*

| DEVICE ID | ASSIGNED DEVICE |
|---|---|
| 00000 | NOTE BOOK LAYOUT KEYBOARD |
| 00001 | DESKTOP LAYOUT KEYBOARD |
| 00010 | REMOTE CONTROLLER |
| 00011~11100 | RESERVED FOR FURTHER USE |
| 11011 | TABLET |
| 11001 | TOUCHPAD |
| 11101 | 16 DIRECTIONAL POINTING DISC |
| 11110 | JOYSTICK(I-POINT) |
| 11111 | (TRACK-BALL) |

CHECK SUM CALCULATION

| ONE PACKET | BYTE 1 | 11111001 |
|---|---|---|
| | BYTE 2 | 00000111 |
| | BYTE 3 | 11111110 |
| | BYTE 4 | 00000000 |
| | BYTE 5 | 10010001 |
| | BYTE 6 | 0000 CHECK SUM |

```
              1111
              1001
              0000
              0111
              1111
              1110
              0000
              0000
              1001
              0001
        +     0000
        ─────────────
        100(CARRY) 0110
```

METHOD FOR TRANSMITTING MULTIMEDIA WIRELESS DATA TO A HOST SYSTEM

FIELD OF THE INVENTION

The present invention relates to a wireless communications; and, more particularly, a method for transmitting multimedia wireless data to a host system by using a radio frequency or infrared transmitter.

DESCRIPTION OF THE PRIOR ART

Data entry devices such as keyboard and mouse are widely being used in inputting data to a host system. In general, both of the keyboard and the mouse are connected to the host system via a cable. When an alphanumeric key on the keyboard or a button on the mouse are pressed by an user, a corresponding key code or a corresponding button code are generated to be transmitted to the host system through the cable. In the host computer, each received code is decoded into its corresponding value, the value being assigned with a specific function for the host system to perform.

As a result of the host system and the data entry devices being connected by the cable, key or button data can be transferred to the host system without entailing any loss of data. Unfortunately, however, the use of cable, in addition to being cumbersome, limits the placement of the data entry devices with respect to the host system to its length.

Accordingly, a wireless data communication between the data entry devices and the host system has been proposed utilizing electromagnetic waves or infra-reds(IR). However, in comparison with the prior art data entry devices using the cable, the data entry devices using the wireless communication are saddled with a relatively slow data communication speed and a low degree of reliability.

FIG. 1 shows a conventional wireless data entry device for transmitting wireless data to a host system 50, which includes a key matrix circuit 10, a microprocessor 20, an infrared(IR) transmitter 30, a pointing device 40 with a position detection unit 41 and a button detection unit 42. The microprocessor 20 continuously scans the key matrix circuit 10 to check whether or not a key has been pressed; if pressed, seeks a keyboard scan code corresponding to the pressed key; converts the same into a predetermined format of serial data(hereinafter called a system scan code) adapted for the host system 50; and transmits it to the host system 50 using the IR transmitter 30. The IR transmitter 30, which incorporates more than one light emitting diode(LED) therein, receives the system scan code from the microprocessor 20, emits IR data corresponding thereto to a receiving unit(not shown) of the host system 50.

The data transmission format used in the conventional device includes four blocks of a header H, a status code S, data D and a check sum C. The header H is the data for indicating to the host system 50 a start of the IR data transmission. The check sum C is used in checking for a data loss which may occur during the transmission. The data D includes eight bits of data, seven bits of which defining the key codes and one bit of which defining the On/Off codes.

The On code is the code which is transmitted when a key is pressed and the Off code is the code which is transmitted when the key is released. In general, since the total number of the keys on the keyboard is about 110 at maximum, all of the key data on the keyboard can be expressed with eight bits data.

As described above, a series of data stream formed so is converted into IR pulse data to be transmitted to the receiving unit of the host system 50. On the other hand, in the case of a pointing device 40, e.g., a mouse, when an user operates the pointing device 40, the position data from the position detection unit 41 and the button data from the button detection unit 42 are transmitted to the microprocessor 20. The position data is divided into horizontal coordinate data and vertical coordinate data, and the button data indicates a press or a release condition of the left or the right buttons on the pointing device 40.

Subsequent processes for the pointing device 40 are performed in a similar manner to the case of the key matrix circuit 10 of the keyboard; and, therefore, a further description thereof will be omitted herein.

Although, in the above data transmission format, the key data may be transmitted as one byte to thereby shorten the data length and enhance the data transmission speed, the prior art device with such format has some drawbacks. Specifically, if, for example, on the keyboard, any character key on the keyboard having two symbolic characters or a combination of one number and one symbolic character is simultaneously pressed together with one or more modifier key(s), such as Shift, Alt, Ctrl, Windows and Application keys, a system scan code for the pressed key becomes identical. That is, the microprocessor 20 in the device first transmits only the press information of the modifier key(s), and then transmits the system scan code for the character key. In such situation, the host system first remembers the press information of the modifier key(s) and determines whether the upper or lower character code on the pressed character key should be generated, based on an incoming system scan code corresponding to the pressed character key.

However, during the transmission of the system scan code to the host system, a loss of the system scan code data may result. For example, system scan code for the modifier key(s) may not get transmitted to the host system, even if the modifier key(s) is pressed. Since the modifier key(s) controls the function of the pressed character key, this situation must be remedied.

SUMMARY OF THE INVENTION

It is, therefore, a primary object of this invention to provide a method for transmitting multimedia wireless data to a host system without incurring any loss of data.

In accordance with the present invention, there is provided a method for transmitting multimedia wireless data to a host system, the method comprising the steps of:

(a) generating a key signal corresponding to a selected key;

(b) converting the key signal into a series of data symbols, each of the data symbols having a plurality of chip data, and activating one or more chip data from the plurality of chip data; and (c) converting each data symbol having the one or more activated chip data into an infrared pulse stream and transmitting it as the multimedia wireless data.

BRIEF DESCRIPTION OF THE DRAWINGS

The above and other objects and features of the present invention will become apparent from the following description of preferred embodiments given in conjunction with the accompanying drawings, in which:

FIG. 1 shows a schematic block diagram illustrating a prior art wireless communication system;

FIGS. 2A to 2C offer a data configuration in accordance with 4 pulse position modulation(PPM) scheme of the present invention;

FIG. 5 exemplifies a data transmission format for a desktop keyboard in accordance with the present invention;

FIG. 6 designates a data transmission format for a mouse or a track-ball in accordance with the present invention;

FIG. 7 exhibits a data transmission format for a tablet in accordance with the present invention;

FIG. 8 presents a table of identification(ID) codes assigned to each device in accordance with the present invention;

DETAILED DESCRIPTION OF THE PREFERRED EMBODIMENT

Figure 3:
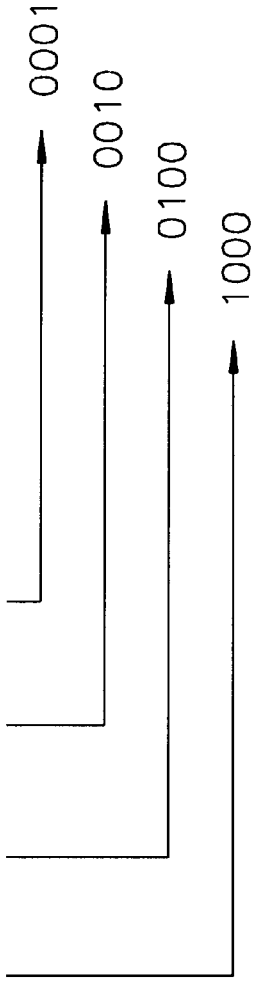
FIG. 3 denotes how various data bytes would be represented after an encoding transmission.

This invention will be described by way of an example with reference to the accompanying drawings.

As previously explained in relation to the prior art, a wireless data entry device which couples wireless data to a host system includes a key matrix circuit 10, a microprocessor 20, an IR transmitter 30, a pointing device 40 having a position detection unit 41 and a button detection unit 42. The pointing device 40 may include a mouse, a trackball, a 16 directional pointing disc, a joystick, an I-point, a tablet or the like(not shown). The host system may be a personal computer, a system for teleconference or the like. The IR transmitter 30 may be a radio frequency transmitter.

The present invention is configured for multimedia communications applications, especially, for cases in which a multiplicity of data entry devices operated by different users are coupled with one host system.

As explained above, the microprocessor 20 applies scanning signals to the key matrix circuit 10 to continuously seek whether a key has been pressed and transmits a system scan code corresponding thereto to the host system 50 through the IR transmitter 30. In accordance with a preferred embodiment of the present invention, the microprocessor 20 encodes the system scan code to be transmitted to the host system 50 into 4 pulse position modulation(PPM) data.

The encoded data is transmitted on a packet basis, wherein the packet includes a plurality of, e.g., six, bytes each of which is divided into four data symbols as shown in FIG. 2A.

As shown in FIG. 2B, the 4PPM data encoding of the present invention is achieved by defining a data symbol duration Dt and subsequently subdividing Dt into a set of equal time slices called "chips" or a data chip duration Ct. In the inventive 4PPM scheme, each chip position within the data symbol represents one of the possible bit combinations. In FIG. 2A, because there are four unique chip positions within each symbol in 4PPM, four independent symbols exist, wherein only one chip is logically "high" while all other chips are logically "low". The invention define these four unique symbols to be the only legal data symbols(DD) allowed in 4PPM. FIG. 2B represents a preset chip pattern representation of the four unique DDs defined for 4PPM. In this drawing, each symbol, i.e., a series of data bit pairs (DBPs) represents payload data, so that a byte of data bit pairs(DBPs) can be represented by four data symbols(DDs) in sequence.

In FIG. 2C, a logical "high" represents a chip duration during which the transmitting LED in the IR transmitter 30 is emitting the light, while logical "low" represents a chip duration during which the LED is off.

FIG. 3 shows how various data bytes would be represented after an encoding transmission. Most significant bits(MSBs) of each byte is first carried out during the data encoding to be first transmitted to the host system 50.

Specifically, data byte of a hexadecimal value X"1B" may be expressed as four DBPs, i.e., "00 01 10 11", the first two DBPs, i.e., "00 01" corresponding to the hexa value "1" and the last two DBPs, i.e., "10 11" corresponding to the hexa value "B". Thereafter, each of the DBPs is converted into its corresponding 4PPM data symbol, "1000010000100001" as shown in FIG. 3. As shown in FIG. 3, a stream of converted 4PPM data symbol is transmitted in sequence to the host system through the IR transmitter 30 in FIG. 1.

Similarly, data byte of a hexadecimal value X"A4" may be expressed as four DBPs, i.e., "10 10 01 00", the first two DBPs, i.e., "1010" corresponding to the hexa value "A4" and the last two DBPs, i.e., "01 00" corresponding to the hexa value "4". Thereafter, each of the DBPs is converted into its corresponding 4PPM data symbol, "0010001001001000" as shown in FIG. 3. After that, a stream of the converted 4PPM data symbol is transmitted to the host system through the IR transmitter 30 in sequence.

Figure 4:
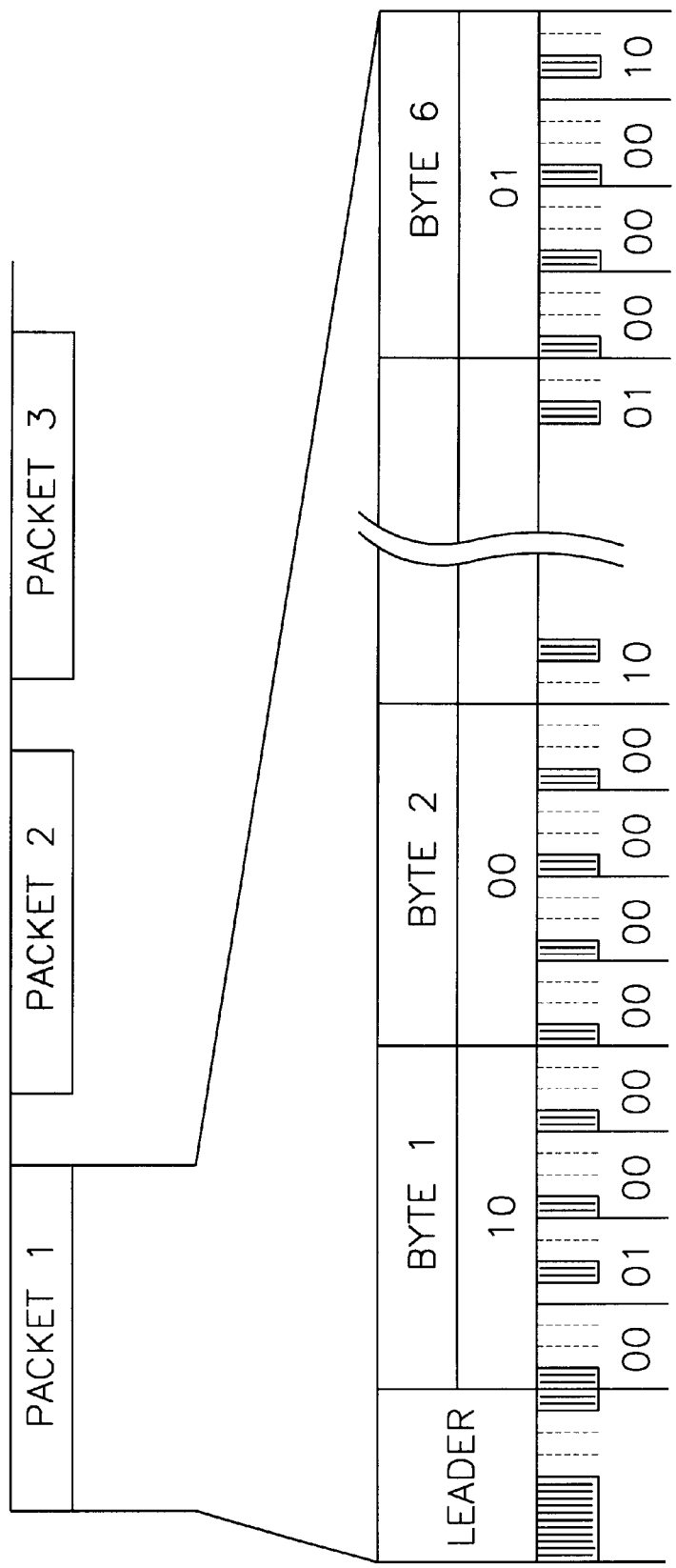
FIG. 4 depicts an infrared data transmission format in accordance with the present invention.

FIG. 4 designates an infra-red transmission protocol in accordance with the present invention. In FIG. 4, "Leader" is a fixed size of data which informs the host system of starting the transmission of one IR packet data, wherein hatched and unhatched portions respectively indicate the outputting and non-outputting of the pulse. Each of two bits of the 1st to 6th byte represents the payload data.

In each byte, hatched portions represent logical "highs", i.e., situations where any one of the four chips is activated, in accordance with the inventive 4PPM scheme.

Packet data formats for each wireless data entry devices using the inventive 4PPM scheme will now be described with reference to FIGS. 5 to 7.

Referring now to FIG. 5, there is shown a packet data format for desktop keyboard constituted by a plurality of, e.g., six, bytes, in accordance with the present invention.

In FIG. 5, the upper five bits of the 1st byte, 00001, represent an identifier(ID) of the desktop keyboard device, which is the information for distinguishing the keyboard device from other wireless data entry devices. The lower three bits thereof represent an Application key, a left-Window key and a right-Window key as the modifier keys, respectively. In this case, if a flag of the lower three bits of the 1st byte is high, it means that their corresponding keys have been pressed; and if otherwise, it means that their corresponding keys have been released.

On the 2nd byte, the bit 7 includes a make & repeat(MR) code indicating a press and repeat condition of any single key and a brake(B) code indicating a release condition of that key. The bit 6 thereof represents whether any function key is pressed. The bit 0 to bit 5 thereon respectively indicate whether right Ctrl key, left Ctrl key, right Alt key, left Alt key, right Shift key and left Shift key are pressed.

Similarly, in the flag of modifier keys, high value represents the condition under which any key has been pressed and low value represents the condition under which the pressed key has been released. The eight bits on the 3rd byte is used in representing the key data corresponding to any pressed key. In the packet data format for keyboard device shown in FIG. 5, 16 bits on the 4th and 5th byte are expressed as null data, thereby allowing to support many different types of multimedia data entry devices which may be introduced for multimedia communication applications in the future.

On the other hand, the upper nibble of the 6th byte is channel information, i.e., an user ID, for determining whether or not the wireless data received by the host system 50 is transmitted from a keyboard device. If desired, the ID may be deleted from the packet data. The lower nibble of the 6th byte define a checksum code which is used in checking whether or not any data loss has occurred during the wireless data transmission. The foregoing will be described in detail hereinafter, with reference to FIGS. 3 and 10A and 10B. Note that the packet data format for the keyboard device may be configured by four bytes without the null data.

In accordance with the present invention, various data entry devices including notebook layout keyboard, desktop keyboard, tablet, touchpad, 16 directional pointing disc, joystick(I-point), mouse(or track-ball) or the like have its assigned identification code, as shown in FIG. 8.

Referring now to FIG. 6, there is shown a packet data format for a mouse or a track-ball which is being frequently used together with the keyboard device.

In FIG. 6, the upper five bits of the 1st byte, 11111, represent the ID of the mouse and the lower three bits thereof represent whether or not any button on the mouse is pressed. Specifically, L-button is the flag of left mouse button which will be set as high if the left button is on, R-button is the flag of right mouse button which will be set as high if the right button is on, and M-button is flag of mid mouse button which will be set as high if the mid button is on.

Figures 9, 10A, 10B:
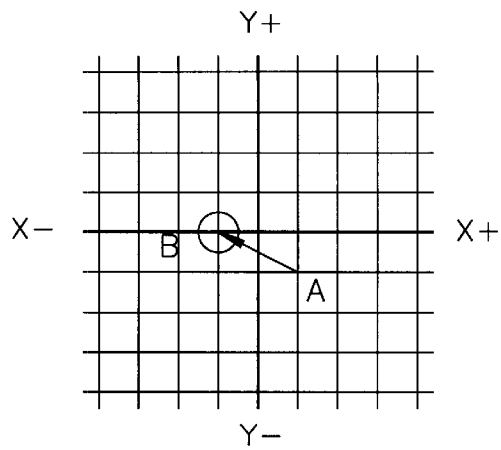
FIG. 9 is a diagram illustrating a displacement when a pointing device is moved in a particular direction.
FIGS. 10A and 10B illustrate how to calculate a checksum code in accordance with the present invention.

Most significant bits of the 2nd and 3rd byte, X-sign and Y-sign, represent a sign bit of a horizontal and vertical movement data, respectively. That is, if the X-sign bit is high, it means that the mouse is being moved leftward starting from a position at which the mouse is currently located. On the other hand, if it is low, it means that the mouse is being moved rightward starting from the current position. Similarly, low or high level of the Y-sign bit means that the mouse is being moved in an upward or downward direction starting from the current position. In other words, such movement data value will be the displacement from previous position. As shown in FIG. 9, for example, if the ball of the mouse is moved from A(1, −1) to B(−1, 0), the horizontal displacement will be −2 and the vertical displacement will be +1. The lower seven bits on the 2nd byte represent the horizontal movement data and the lower seven bits on the 3rd byte represent the vertical movement data. In case the sign of the horizontal and vertical data is minus, each movement data is expressed by two's complement value.

As stated above, 16 bits of the 4th and 5th bytes are assigned as null bytes reserved for further use. The upper nibble of the 6th byte is the ID of an user occupied the mouse or the track-ball and the lower nibble thereof define the checksum code. If desired, the ID may be deleted from the packet data.

Further, note that the packet data format for the mouse or the track-ball device may be configured by four bytes without the null bytes.

Referring now to FIG. 7, there is shown a packet data format for a tablet called digitizer, in accordance with the present invention. The tablet is configured for use with a pointing device such as a four-button cursor or a stylus tip.

As mentioned above, the upper five bits of the 1st byte in FIG. 7 represent the ID of the tablet device. The bit 2 of the 1st byte, "Proximity" represents whether a pointing device is detected, wherein high if the pointing device is detected; and low if otherwise. Bit 1 thereof, "Pointer" is defined as high if the pointing device is the stylus tip, and low if it is the cursor. Bit 0 thereof, "Button" is defined as high if a button on the pointing device has been pressed, and low if otherwise. 16 bits of the 2nd and 3rd byte represent a horizontal movement data, and all bits of the 4th byte and the upper nibble of the 6th byte represent a vertical movement data. In the 5th byte, the most significant bit, "SP" represents a pressure value, wherein the value is low if the pressure value is positive; and high if it is negative. When the pressure value is negative, it is expressed by two's complement form. As stated above, the lower nibble of the 6th byte define the checksum code. The tablet device may be mainly used for teleconference or electronic commerce which utilizes one-to-one communication. For this reason, in the packet data format for tablet, user ID for the tablet may be not assigned within the format.

Packet data formats for the touchpad, the 16 directional pointing disc and the joystick will be omitted herein, since they may be configured in an identical manner as described for the keyboard, the mouse and the tablet described above.

In the following, a calculation of the checksum will be described with reference to FIGS. 10A and 10B.

Assuming that the bit streams of each byte are as shown in FIG. 10A, the checksum calculation is performed as follows. First, each of the 1st to 6th bytes is divided into the upper nibble and the lower nibble, respectively. Thereafter, a series of the divided nibbles are arranged in sequence, as shown in FIG. 10B. In such arrangement, all nibbles are summed in order starting from least significant bits(LSBs) thereof, wherein carry digits, i.e., 100, resulting from such summation are discarded. After that, the checksum data obtained, i.e., 0110, is transmitted to the host system.

In the host system, one packet data transmitted thereto through the IR transmitter 30 in FIG. 1 is decoded into the original data and then the checksum calculation for the decoded packet data is performed in a similar manner to that of the transmitting end. Thus, if the checksum data calculated by the host system is identical to that transmitted from the transmitting end, the host system determines that there has not be loss of data during the transmission, thereby performing a function corresponding to the received packet data.

As may be seen from the above, when modifier key(s) and a character key are simultaneously pressed, the present invention employing 4PPM transmits separately the system scan code(s) corresponding to the modifier key(s) and a system scan code corresponding to the character key to the host system, to thereby allow the host system to correctly recognize the key data to be displayed or functioned.

Furthermore, the transfer of large amounts of wireless data from the wireless data entry device to the host system requires a large power consumption. The present invention using the 4PPM scheme activates only any one of four chips within one data symbol and transmits the same to the host system, thereby further lowering the power consumption.

While the present invention has been described with reference to the particular embodiments, it will be apparent to those skilled in the art that various changes and modifications may be made without departing from the spirit and scope of the invention as defined in the following claims.

What is claimed is:

1. A method for transmitting wireless input data from a data entry device to a host system, comprising the steps of:
   (a) formulating input data to be provided from the data entry device to the host system in a form of a packet of N bytes, the packet including codes for identifying the data entry device and representing a data input generated by the data entry device, N being an integer greater than three;
   (b) dividing the N bytes of the packet into a series of data symbol, each data symbol being composed of two bits and having an identical data symbol duration;
   (c) converting each data symbol into a series of four chips, each chip having an equal chip duration and the sum of four chip durations being equal to one data symbol duration;
   (d) activating one chip among the series of four chips to thereby transmit the wireless input data from the data entry device to the host system.

2. The method of claim 1, wherein the data entry device is one of a desk top keyboard, a mouse, a track-ball, a tablet, a joystick and a touchpad.

3. The method of claim 1, wherein the activating step (d) is carried out by providing an infrared pulse during one chip duration.

4. The method of claim 1, wherein said N is 6.

* * * * *